(12) United States Patent
Fukui

(10) Patent No.: US 6,424,130 B1
(45) Date of Patent: Jul. 23, 2002

(54) OUTPUT VOLTAGE DETECTING CIRCUIT

(75) Inventor: Atsuo Fukui, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/552,475

(22) Filed: Apr. 18, 2000

(30) Foreign Application Priority Data

Apr. 27, 1999 (JP) .......................................... 11-119866

(51) Int. Cl.[7] .............................................. G05F 1/40
(52) U.S. Cl. ..................................... 323/282; 323/285
(58) Field of Search ................................ 323/222, 271, 323/275, 276, 282, 285; 361/18, 86, 91

(56) References Cited

U.S. PATENT DOCUMENTS

| | | | | |
|---|---|---|---|---|
| 4,016,461 A | * | 4/1977 | Roland | 361/18 |
| 4,536,700 A | * | 8/1985 | Bello et al. | 323/285 |
| 5,399,958 A | * | 3/1995 | Iyoda | 323/282 |
| 5,504,418 A | * | 4/1996 | Ashley | 323/282 |
| 5,770,940 A | * | 6/1998 | Goder | 323/282 |

* cited by examiner

Primary Examiner—Matthew Nguyen
(74) Attorney, Agent, or Firm—Adams & Wilks

(57) ABSTRACT

An output voltage detecting circuit is added to a step-down DC-DC converter or a step-up DC-DC converter and is controlled so that an abnormally high increase in a regulated output voltage of the DC-DC converter is detected and the output voltage is inhibited from increasing further so that it may be rapidly returned to a normal value within the range of regulated voltages of the DC-DC converter.

20 Claims, 3 Drawing Sheets

OUTPUT VOLTAGE DETECTING CIRCUIT

BACKGROUND OF THE INVENTION

1. Field of the Invention

The present invention relates to an output voltage detecting circuit for a DC-DC convertor.

2. Description of the Related Art

As a conventional step-up type DC-DC converter, there has been known a circuit shown in FIG. 3. That is, the circuit is made up of an error amplifier 101, a reference voltage source 102, a chopping wave generating circuit 103, a voltage comparator 104, a P-MOS transistor 105 functioning as a switching element, a Schottky diode 106, a voltage dividing circuit 110 formed of a resistor 108 and a resistor 109, and a smoothing circuit formed of a coil 107 and a capacitor 111. A difference between a voltage at a terminal B resulting from dividing a voltage VOUT of an output terminal OUT by a voltage dividing circuit 110 and a voltage at a terminal A which is an output of the reference voltage source 102 is amplified by the error amplifier 101. An output voltage of the error amplifier 101 and a chopping wave output by the chopping wave generating circuit 103 are compared with each other by the voltage comparator 104, and the P-MOS transistor 105 functioning as the switching element is rendered conductive or nonconductive to obtain a constant regulated output voltage VOUT at the output terminal OUT.

In the case where the amplification degree of the error amplifier 101 is sufficiently large, and assuming that the resistance value of the resistor 108 is R108, the resistance value of the resistor 109 is R109 and the voltage at the terminal A which is the output of the reference voltage source 102 is VREF, the voltage VOUT at the output terminal OUT is controlled so as to satisfy Expression (1).

$$VOUT=(1+R108/R109) \times VREF \qquad (1)$$

The conventional step-up type DC-DC converter shown in FIG. 3 suffers from a drawback in that the output voltage VOUT is boosted to be higher than the desired regulated output voltage when a load rapidly changes or a ripple voltage abnormally increases. When the output voltage VOUT greatly exceeds the desired regulated output range voltage, since an excessive voltage is applied to the load, there arises the problem that an electronic circuit connected to the DC-DC converter as the load maybe destroyed.

SUMMARY OF THE INVENTION

The present invention has been made to solve the above problem with the conventional DC-DC converter, and therefore an object of the present invention is to provide an output voltage detecting circuit which is capable of preventing the output voltage from abnormally increasing beyond the desired regulated output voltage range.

In order to achieve the above object, according to the present invention, there is provided an output voltage detecting circuit that monitors a voltage VOUT at an output terminal in the DC-DC converter, and immediately stops the operation of the DC-DC converter to prevent the output from further increasing when the output voltage abnormally exceeds the desired regulated output range voltage.

BRIEF DESCRIPTION OF THE DRAWINGS

These and other objects, features and advantages of this invention will become more fully apparent from the following detailed description taken with the accompanying drawings in which.

DETAILED DESCRIPTION OF THE PREFERRED EMBODIMENTS

Now, a description will be given in more detail of preferred embodiments of the present invention with reference to the accompanying drawings.

Figure 1:
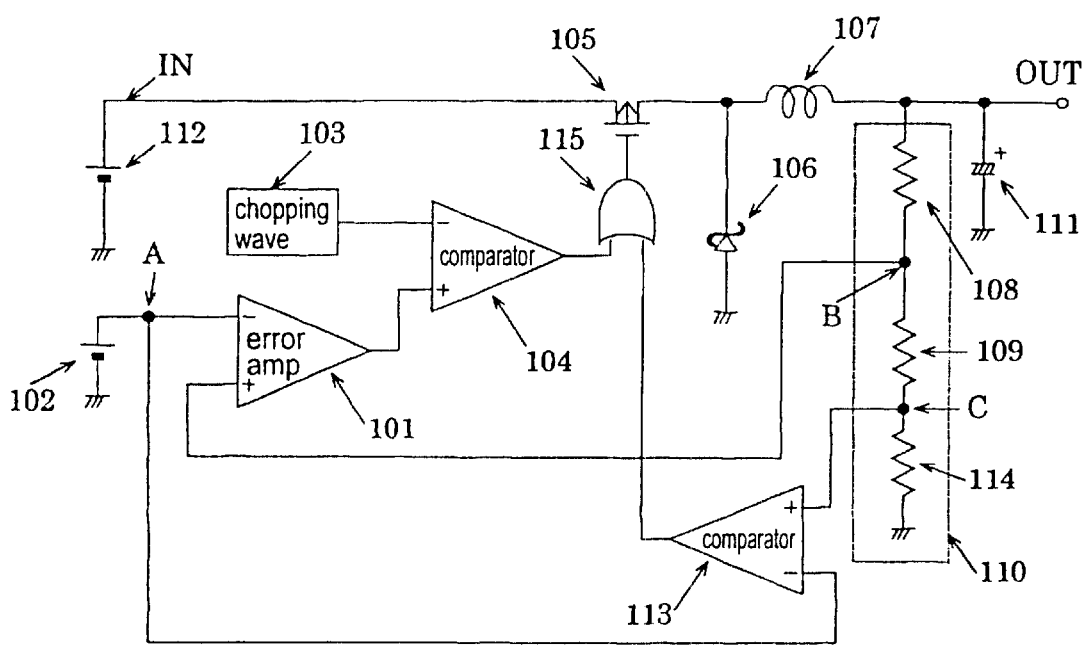
FIG. 1 shows a step-down type DC-DC converter in accordance with a first embodiment of the present invention.

FIG. 1 shows a step-down type DC-DC convertor in accordance with a first embodiment of the present invention. Referring to FIG. 1, the step-down type DC-DC convertor is made up of an error amplifier 101, a reference voltage source 102, a chopping wave generating circuit 103, a voltage comparator 104, a P-MOS transistor 105 functioning as a switching element, a Schottky diode 106, a voltage dividing circuit 110 formed of a resistor 108, a resistor 109 and a resistor 114, a smoothing circuit formed of a coil 107 and a capacitor 111, and an OR gate circuit 115.

In a normal state, assuming that the resistance value of the resistor 108 is R108, the resistance value of the resistor 109 is R109, the resistance value of the resistor 114 is R114, and the voltage at the terminal A which is the output of the reference voltage source 102 is VREF, the voltage VOUT at the output terminal OUT is represented by the following Expression (2).

$$VOUT=(1+R108/(R109+R114)) \times VREF \qquad (2)$$

Accordingly, a voltage VB at a terminal B which is one output of the voltage dividing circuit 110 at a node between resistors R108 and R109 is represented by the following Expression (3).

$$VB=((R109+R114)/(R109+R114+R108)) \times VOUT \qquad (3)$$

If Expression (2) is substituted for Expression (3), the voltage VB at the terminal B is represented by the following Expression (4).

$$VB=VREF \qquad (4)$$

On the other hand, the voltage VC at a terminal C which is another output C of the voltage dividing circuit 110 is represented by the following Expression (5).

$$VC=(R114/(R109+R114+R108)) \times VOUT \qquad (5)$$

If Expression (2) is substituted for Expression (5), the voltage VC at the terminal C is represented by the following Expression (6).

$$VC=(R114/(R109+R114)) \times VREF \qquad (6)$$

Figure 3:
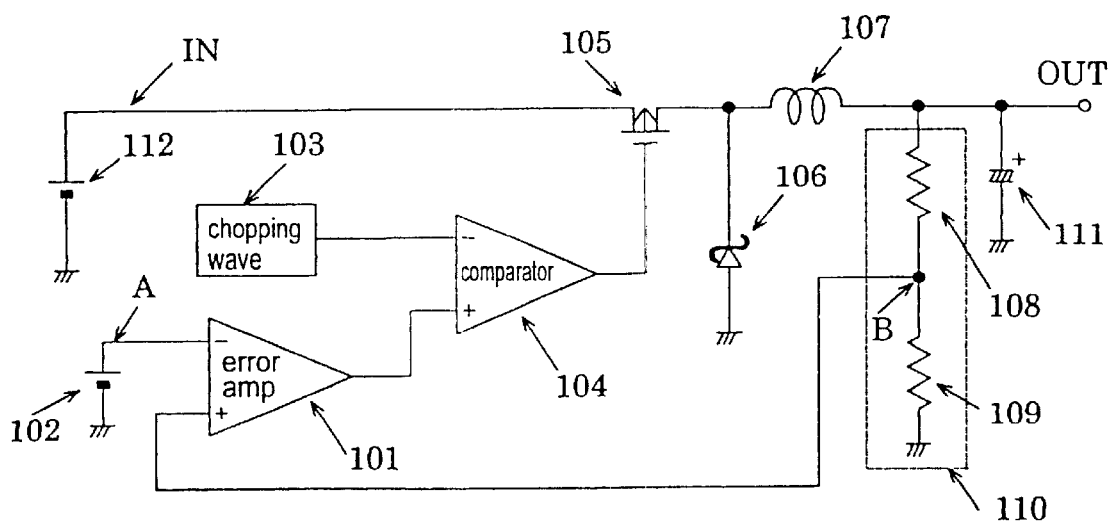
FIG. 3 shows a circuit diagram showing a conventional step-up type DC-DC converter.

In the case where the output voltage VOUT of the output terminal OUT is at a normal state, the voltage VC at the terminal C is clearly smaller than the voltage VREF at the terminal A which is the output of the reference voltage source 102. Accordingly, since the output of the voltage comparator 113 is at a low state, the output state of the OR circuit 115 becomes identical with the output state of the voltage comparator 104. Therefore, the P-MOS transistor 105 as the switching element is controlled in the same manner where it is controlled by the output of the voltage comparator 104 of the conventional circuit shown in FIG. 3 and is operated entirely in the same manner as the conventional step-up type DC-DC convertor.

However, if the voltage VOUT at the output terminal OUT abnormally rises due to a rapid change in the load, an abnormal increase in the ripple voltage or the like, and the voltage VC at the terminal C which is one output of the voltage dividing circuit 110 exceeds the voltage VREF at the terminal A which is the output of the reference voltage source 102, the output of the voltage comparator 113 becomes in a high state. As a result, the output state of the OR circuit 115 is placed always high regardless of the output state of the voltage comparator 104. Accordingly, since the P-MOS transistor 105 as the switching element becomes non-conductive state, the voltage VOUT at the output terminal OUT is inhibited from further abnormally rising, and the output voltage VOUT is rapidly returned to a normal value under control. The voltage comparator 113 compares the voltage VC at the terminal C which is the output of the voltage dividing circuit 110 with the voltage VREF at the terminal A which is the output of the reference voltage source to output a comparison result. In other words, if the voltage VC at the terminal C is larger than the voltage VREF at the terminal A which is the output of the reference voltage source, the voltage comparator 113 judges that the output voltage VOUT is abnormally rising. That is, if the following relationship is satisfied with the application of Expression (5), the voltage comparator 113 judges that the output voltage VOUT is abnormally rising, the P-MOS transistor 105 as the switching element is rendered non-conductive, the voltage VOUT at the output terminal OUT is inhibited from further abnormally rising and output voltage VOUT is rapidly returned to a normal value under control. If the resistance values of the resistors R108, R109 and R114 are set to appropriate values from Expression (7), the detected voltage value can be set to an appropriate value.

$$VOUT > ((R109+R114+R108)/R114) \times VREF \quad (7)$$

Figure 2:
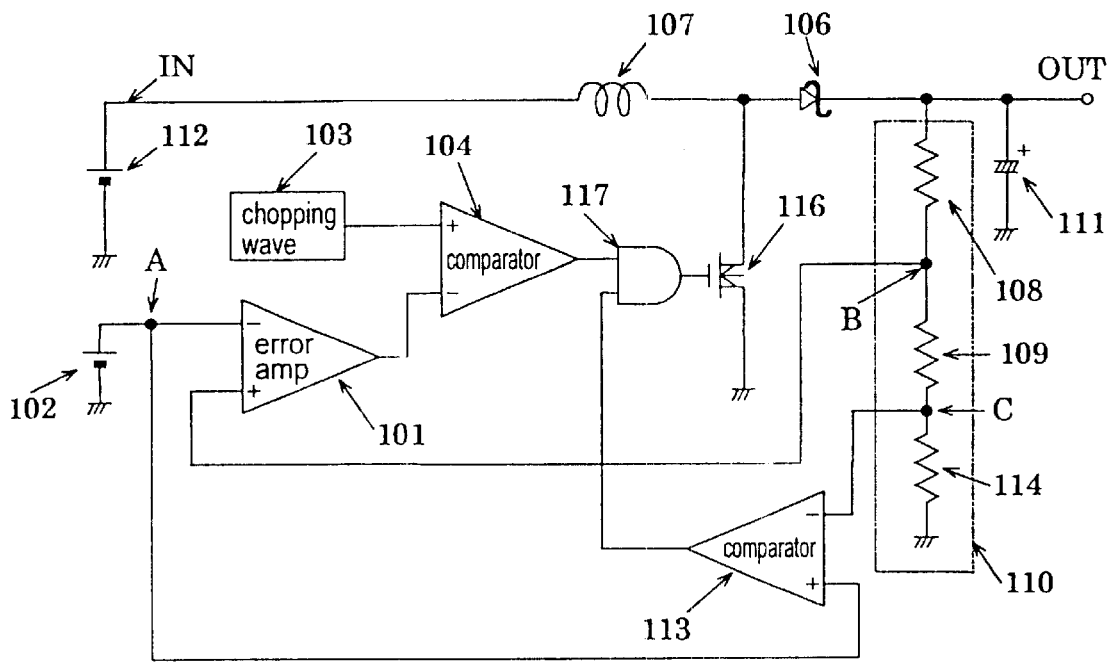
FIG. 2 shows a step-up type DC-DC converter in accordance with a second embodiment of the present invention.

FIG. 2 shows a step-up DC-DC converter in accordance with a second embodiment of the present invention. Referring to FIG. 2, in the step-up DC/DC converter, a voltage comparator 113, an AND gate circuit 117 and a resistor 114 within the voltage dividing circuit 110 are added to the conventional step-up DC-DC convertor made up of an error amplifier 101, a reference voltage source 102, a chopping wave generating circuit 103, a voltage comparator 104, an N-MOS transistor 116 functioning as a switching element, a Schottky diode 106, a coil 107, a voltage dividing circuit 110 formed of a resistor 108 and a resistor 109, and a capacitor 111. With the above structure, the abnormally rising of the voltage VOUT at the output terminal OUT is detected, the output voltage VOUT is inhibited from further abnormally rising, and the output voltage VOUT is rapidly returned to the normal value under control.

In the step-up DC-DC converter shown in FIG. 2, the voltage VC at the terminal C which is one output of the voltage dividing circuit 110 is compared with the voltage VREF at the terminal A which is the output of the reference voltage source by the voltage comparator 113, as in the step-down type DC-DC converter according to the first embodiment shown in FIG. 1.

In the case where the output voltage VOUT of the output terminal OUT is at a normal state, the voltage VC at the terminal C is smaller than the voltage VREF at the terminal A which is the output of the reference voltage source 102. As a result, the output of the voltage comparator 113 is at a high state, and the output state of the AND gate circuit 117 becomes identical with the output state of the voltage comparator 104. Therefore, the N-MOS transistor 116 as the switching element is controlled in the same as manner where it is controlled solely by the output of the voltage comparator 104 and operated entirely in the same manner as the conventional step-up type DC-DC convertor.

However, if the voltage VOUT at the output terminal OUT abnormally goes up due to a rapid change of the load, an abnormal increase of the ripple voltage or the like, and the voltage VC at the terminal C which is one output of the voltage dividing circuit 110 exceeds the voltage VREF at the terminal A which is the output of the reference voltage source 102, the output of the voltage comparator 113 becomes in the low state. As a result, the output state of the AND circuit 117 becomes always low regardless of the output state of the voltage comparator 104. Accordingly, since the N-MOS transistor 116 as the switching element becomes in an inconductive state, the voltage VOUT at the output terminal OUT is inhibited from further abnormally going up, and the output voltage VOUT is rapidly returned to a normal value under control. Also, it is apparent that if the resistant values of the resistors R108, R109 and R114 are set to appropriate values, the detected value of the abnormally going-up output voltage VOUT can be set to an appropriate value.

As was described above, since the excessive output voltage detecting circuit is added to the conventional step-down type DC-DC convertor or step-up type DC-DC convertor, the abnormally going-up of the voltage VOUT is detected, the output voltage VOUT is inhibited from further abnormally going up, and the output voltage VOUT can be rapidly returned to the normal value under control.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A voltage converter comprising: an input terminal for receiving a DC input voltage; an output terminal for outputting a DC regulated output voltage; a regulating circuit for detecting a level of the regulated output voltage and controlling the level thereof so that the regulated output voltage is maintained within a predetermined voltage range, the regulating circuit comprising a DC-DC converter circuit having a switching element connected to the output terminal, a reference voltage source for producing a reference voltage, a chopping wave generating circuit for producing a chopping wave, a voltage dividing circuit having first and second resistors for dividing the regulated output voltage and producing a first divided output voltage at a node between the first and second resistors, a smoothing circuit for smoothing an output of the switching element, an error amplifier for receiving the divided output voltage and the reference voltage and producing an error signal, and a first comparator for comparing the error signal and the chopping wave and producing a comparison output for driving the switching element; and a voltage detecting circuit for detecting when the regulated output voltage has increased above the predetermined voltage range and preventing the regulated output voltage from further increasing so that the regulated output voltage rapidly returns to a value within the predetermined voltage range; wherein the voltage dividing circuit further comprises a third resistor connected to the second resistor so that a second divided output voltage is produced at a node between the second and third resistors; and wherein the voltage detecting circuit comprises the third resistor, a second comparator for comparing the reference voltage and the second divided output voltage, and a logic circuit for performing a logical operation on an output of the first comparator and the second comparator and producing a signal for controlling the conduction state of the switching element.

2. A voltage converter according to claim 1; wherein the logic circuit comprises an OR gate.

3. A voltage converter according to claim 2; wherein the switching element comprises a P-MOS transistor.

4. A voltage converter according to claim 1; wherein the logic circuit comprises an AND gate.

5. A voltage converter according to claim 4; wherein the switching element comprises an N-MOS transistor.

6. A voltage converter according to claim 1; wherein the voltage dividing circuit and the reference voltage source are connected so that the output voltage satisfies the relationship $$VOUT=(1+R1/(R2+R3))\times VREF$$

wherein R1 is a resistance value of the first resistor, R2 is a resistance value of the second resistor, R3 is a resistance value of the third resistor, VREF is the reference voltage and VOUT is the regulated output voltage.

7. A voltage converter according to claim 6; wherein the voltage dividing circuit is connected so that the first divided output voltage satisfies the relationship $$VB=((R2+R3)/(R1+R2+R3))\times VOUT$$

wherein VB is the first divided output voltage, R1 is a resistance value of the first resistor, R2 is a resistance value of the second resistor, R3 is a resistance value of the third resistor, and VOUT is the regulated output voltage.

8. A voltage converter according to claim 6; wherein the voltage dividing circuit is connected so that the second divided output voltage satisfies the relationship $$VC=(R3/(R1+R2+R3))\times VOUT$$

wherein VC is the second divided output voltage, R1 is a resistance value of the first resistor, R2 is a resistance value of the second resistor, R3 is a resistance value of the third resistor, and VOUT is the regulated output voltage.

9. A voltage converter according to claim 6; wherein the voltage dividing circuit is connected so that the second divided output voltage satisfies the relationship $$VC=(R3/(R1+R2))\times VREF$$

wherein VC is the second divided output voltage, R1 is a resistance value of the first resistor, R2 is a resistance value of the second resistor, and VREF is the reference voltage.

10. An output voltage detecting circuit for reducing an abnormally high output voltage of a voltage converter to within a predetermined output voltage range of the voltage converter and preventing the output voltage of the voltage converter from increasing further, comprising:

an input terminal connected to an input power source;

an output terminal for outputting a regulated output voltage;

a switching element connected to the input terminal;

a chopping wave generating circuit for generating a chopping wave;

a voltage divider circuit comprising a plurality of series-connected resistors for dividing the regulated output voltage and producing a plurality of divided output voltages at nodes between the respective resistors;

an error amplifier for comparing a reference voltage to a first divided output voltage at a node between first and second resistors of the voltage divider circuit and producing an error signal;

a first comparator for comparing the error signal and the chopping wave;

a second comparator for comparing the reference voltage and a second divided output voltage at a node between second and third resistors of the voltage divider circuit; and a logic circuit for performing a logic operation on outputs of the first and second comparators and controlling the switching element in accordance with the result of the logic operation.

11. An output voltage detecting circuit according to claim 10; further comprising a Schottky diode connected to the switching element.

12. An output voltage detecting circuit according to claim 10; wherein the smoothing circuit comprises a coil and a capacitor connected to the output terminal.

13. An output voltage detecting circuit according to claim 10; wherein the switching element comprises a P-MOS transistor connected between the input terminal and the output terminal.

14. An output voltage detecting circuit according to claim 10; wherein the logic circuit comprises an OR gate.

15. An output voltage detecting circuit according to claim 10; wherein the logic circuit comprises an AND gate.

16. An output voltage detecting circuit according to claim 10; wherein the switching element comprises an N-MOS transistor.

17. An output voltage detecting circuit according to claim 10; wherein the voltage dividing circuit has three series-connected resistors so that the regulated output voltage satisfies the relationship $$VOUT=(1+R1/(R2+R3))\times VREF$$

wherein R1 is a resistance value of the first resistor, R2 is a resistance value of the second resistor, R3 is a resistance value of the third resistor, VREF is the reference voltage and VOUT is the regulated output voltage.

18. An output voltage detecting circuit according to claim 10; wherein the voltage dividing circuit has three series-connected resistors so that a first divided output voltage satisfies the relationship $$VB=((R2+R3)/(R1+R2+R3))\times VOUT$$

wherein VB is the first divided output voltage, R1 is a resistance value of the first resistor, R2 is a resistance value of the second resistor, R3 is a resistance value of the third resistor, and VOUT is the regulated output voltage.

19. An output voltage detecting circuit according to claim 10; wherein the voltage dividing circuit is connected so that a second divided output voltage satisfies the relationship $$VC=(R3/(R1+R2+R3))\times VOUT$$

wherein VC is the second divided output voltage, R1 is a resistance value of the first resistor, R2 is a resistance value of the second resistor, R3 is a resistance value of the third resistor, and VOUT is the regulated output voltage.

20. An output voltage detecting circuit according to claim 19; wherein the voltage dividing circuit is connected so that the second divided output voltage satisfies the relationship $$VC=(R3/(R1+R2))\times VREF$$

wherein VREF is the reference voltage.

* * * * *